(12) United States Patent
Gruber (10) Patent No.: US 7,104,553 B2
(45) Date of Patent: Sep. 12, 2006

(54) TRAY AND DOLLY ASSEMBLY

(75) Inventor: Robert V. Gruber, Hermosa Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 11/064,144

(22) Filed: Feb. 22, 2005

(65) Prior Publication Data

US 2005/0140107 A1 Jun. 30, 2005

Related U.S. Application Data

(63) Continuation of application No. 10/621,974, filed on Jul. 17, 2003, now Pat. No. 6,857,642, which is a continuation of application No. 09/839,018, filed on Apr. 20, 2001, now Pat. No. 6,607,199.

(51) Int. Cl.
*B62B 3/02* (2006.01)

(52) U.S. Cl. .............................. 280/33.991; 280/33.997; 280/33.998; 280/79.11; 280/43.12; 206/509; 206/505

(58) Field of Classification Search ............... 280/32.6, 280/33.991, 33.992, 33.997, 33.998, 43.12, 280/79.2, 79.5, 79.11; 248/346.01; 220/4.26, 220/4.27; 206/503, 505, 509, 511
See application file for complete search history.

(56) References Cited

U.S. PATENT DOCUMENTS

| | | | | | |
|---|---|---|---|---|---|
| 1,668,379 | A | * | 5/1928 | Radvanyi | 280/32.6 |
| 3,282,458 | A | * | 11/1966 | Rudd | 217/26.5 |
| 4,298,127 | A | * | 11/1981 | Upshaw et al. | 211/126.9 |
| 4,917,255 | A | * | 4/1990 | Foy et al. | 220/6 |
| 5,142,445 | A | * | 8/1992 | Sorensen et al. | 361/726 |
| 5,287,966 | A | * | 2/1994 | Stahl | 206/509 |
| 5,344,022 | A | * | 9/1994 | Stahl | 206/507 |
| 5,427,394 | A | * | 6/1995 | Lauto | 280/47.35 |
| 5,695,205 | A | * | 12/1997 | Liu | 280/79.2 |
| 5,718,441 | A | * | 2/1998 | Kern et al. | 280/79.3 |
| 6,042,127 | A | * | 3/2000 | Rupolo | 280/33.998 |
| 6,105,980 | A | * | 8/2000 | Cino et al. | 280/33.998 |
| 6,193,247 | B1 | * | 2/2001 | Spear et al. | 280/33.998 |
| 6,257,152 | B1 | * | 7/2001 | Liu | 108/53.3 |
| 6,260,706 | B1 | * | 7/2001 | Koefelda | 206/505 |
| 6,394,274 | B1 | * | 5/2002 | Cheeseman | 206/511 |
| 6,607,199 | B1 | * | 8/2003 | Gruber | 280/33.991 |
| 6,857,642 | B1 | * | 2/2005 | Gruber | 280/33.991 |
| 2002/0153682 | A1 | * | 10/2002 | Gruber | 280/79.11 |
| 2003/0205877 | A1 | * | 11/2003 | Verna et al. | 280/79.11 |

FOREIGN PATENT DOCUMENTS

| | | | |
|---|---|---|---|
| DE | 3316896 A1 | * | 11/1984 |
| GB | 2353012 A | * | 2/2001 |
| JP | 6-206545 | * | 6/1994 |

\* cited by examiner

*Primary Examiner*—J. Allen Shriver (57) ABSTRACT

A dolly and a tray and dolly assembly are provided. The dolly has a floor with upper and lower surfaces and with one or more features such that when the tray floor is received on the dolly floor, the feature interlocks the tray with the dolly. One feature is a plurality of protruding members extending upwardly from the dolly floor upper surface into openings in the tray floor to interlock the tray with the dolly. Another features is the presence of dolly side wall locking portions configured to abut and mate with corresponding tray side wall bottom locking portions on the tray to interlock the dolly with the tray.

11 Claims, 7 Drawing Sheets

TRAY AND DOLLY ASSEMBLY

CROSS-REFERENCE TO RELATED APPLICATION

This application is a continuation of application U.S. Ser. No. 10/621,974, filed Jul. 17, 2003, now U.S. Pat. No. 6,857,642 which is a continuation of U.S. Ser. No. 09/839,018, filed Apr. 20, 2001, now U.S. Pat. No. 6,607,199

BACKGROUND OF THE INVENTION

1. Field of the Invention

The present invention relates to a tray and dolly assembly.

2. Background Art

A typical dolly has a generally flat floor which may be supported by casters. A tray may then be placed on the dolly. Sometimes, the tray is configured to allow multiple trays to be stacked on top of each other with the bottom tray resting on the dolly. These stackable trays are suitable for many purposes, including use as a multi-level bakery tray. An existing multi-level bakery tray is disclosed in U.S. Pat. No. 5,881,902 issued to Ackerman which is hereby incorporated by reference in its entirety. U.S. Pat. No. 5,881,902 describes a multi-level bakery tray with a generally rectangular bottom and generally rectangular opposed sides and end walls. When multiple trays are stacked on top of one another, the distance between one tray floor and the next tray floor is determined by the orientation of the trays relative to each other. That is, when multiple trays are stacked in a like orientation, shallow pockets receive feet in a high position, and when one tray is rotated 180 degrees, deep pockets receive the feet in a low position. Although improved trays such as that shown in U.S. Pat. No. 5,881,902 have been developed, existing dollies are still rather plain and generally lack features. That is, with some existing dollies, trays may sometimes slip off of the dolly or become misaligned. Some existing dollies have a retaining lip around the outside edge of the dolly to retain the tray.

For the foregoing reasons, there is a need for an improved dolly and an improved tray and dolly assembly in which the dolly includes improved features that help prevent trays from slipping off the dolly and/or becoming misaligned. Also, there is a need for enhancing the stackability of trays upon a dolly.

SUMMARY OF THE INVENTION

It is, therefore, an object of the present invention to provide an improved dolly, and an improved tray and dolly assembly in which the dolly includes one or more features that compliment the tray features to provide an overall enhanced tray and dolly assembly.

In carrying out the above object, a tray and dolly assembly is provided. The tray and dolly assembly comprises a dolly and a tray. The dolly has a floor with upper and lower surfaces. The floor has a plurality of protruding members extending upwardly from the floor upper surface. The tray has a floor with upper and lower surfaces. The tray floor has a plurality of openings. The tray further has a pair of opposed side walls. When the tray floor is received on the dolly floor, the plurality of protruding members extends into the plurality of openings to interlock the tray with respect to the dolly. Advantageously, the upwardly extending protruding members on the dolly floor cooperate with the openings in the tray floor to provide improved interlocking of the tray with the dolly.

Preferably, the tray and dolly assembly further comprises a plurality of casters supporting the dolly floor. More preferably, the dolly floor is rectangular in shape and has four corners. The plurality of casters is preferably four casters with a caster located proximate each corner of the dolly floor.

In a preferred embodiment, the plurality of tray floor openings extend through the tray floor (as opposed to forming only recesses in the tray floor). Further in a preferred embodiment, the tray floor comprises a lattice structure defining the plurality of openings, and the plurality of protruding members extends into the plurality of openings but does not extend beyond the tray floor upper surface. In this way, the dolly floor protruding members do not interfere with the lattice floor of the tray. In a suitable implementation, the protruding members are diamond-shaped, and the dolly floor is rectangular in shape and defines a central opening.

Further, in carrying out the present invention, a tray and dolly assembly is provided. The tray and dolly assembly comprises a dolly and a tray. The dolly has a floor with upper and lower surfaces, and a pair of opposed side walls wherein each side wall has a locking portion. The tray has a floor with upper and lower surfaces. The tray has a pair of opposed side walls wherein each side wall has a bottom locking portion. Each dolly side wall locking portion is configured to abut and mate with a corresponding tray side wall bottom locking portion on the tray to interlock the dolly with the tray. In a preferred implementation, each tray side wall has a top locking portion, and each tray side wall top locking portion is configured to abut and mate with a corresponding tray side wall bottom locking portion of a next tray to allow a stack of trays to be placed on the dolly with adjacent trays interlocked with each other.

Preferably, the dolly floor is rectangular with four corners and with a caster located proximate each corner of the dolly floor. In a preferred implementation, each dolly side wall locking portion has a plurality of inwardly extending locking portions.

More preferably, each tray side wall top locking portion includes a plurality of inwardly extending locking portions that are shaped substantially the same as the dolly side wall locking portions inwardly extending locking portions. In a suitable implementation, each dolly side wall locking portion has a middle trapezoidal inwardly extending locking portion and each tray side wall bottom locking portion has a middle trapezoidal recess. Further, in a suitable implementation, each dolly side wall locking portion further has a pair of outside triangular inwardly extending locking portions, and each tray side wall bottom locking portion further has a pair of outside recesses.

Still further, in carrying out the present invention, a tray and dolly assembly is provided. The tray and dolly assembly comprises a dolly and a tray. The dolly has a floor with upper and lower surfaces and with a plurality of protruding members extending upwardly from the upper surface, and a pair of opposed side walls wherein each side wall has a locking portion. The tray has a floor with upper and lower surfaces and with a plurality of openings. The tray further has a pair of opposed side walls wherein each side wall has a bottom locking portion and a top locking portion.

Each dolly side wall locking portion is configured to abut and mate with a corresponding tray side wall bottom locking portion on the tray to interlock the dolly with the tray such that the plurality of protruding members extends into the plurality of openings. Each tray side wall top locking portion is configured to abut and mate with a corresponding tray side wall bottom locking portion of a next tray. This allows a stack of trays to be placed on the dolly with adjacent trays interlocked with each other.

Preferred implementations of the tray and dolly assembly comprehend additional features mentioned previously, including casters, protruding members extending into the openings but not extending beyond the tray floor upper surface, a tray floor lattice structure, and inwardly extending locking portions on each dolly side wall, among other features. Advantageously, in this embodiment, the protruding members extend into the openings while the dolly side wall locking portions abut mate with the tray side wall bottom locking portions to interlock the dolly and the tray.

The advantages associated with embodiments of the present invention are numerous. Embodiments of the present invention provide various embodiments for a dolly and various embodiments for a tray and dolly assembly that improve over existing dollies and existing tray and dolly assemblies. Advantageously, embodiments of the present invention provide enhanced features on the dolly that, when a tray is placed in the dolly, cooperate with features on the tray to interlock the dolly and the tray. Suitable implementations have a feature or multiple features on the dolly that prevent the tray from slipping off of the dolly, and impede translation or rotation of the tray with respect to the dolly when the tray is received on the dolly.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
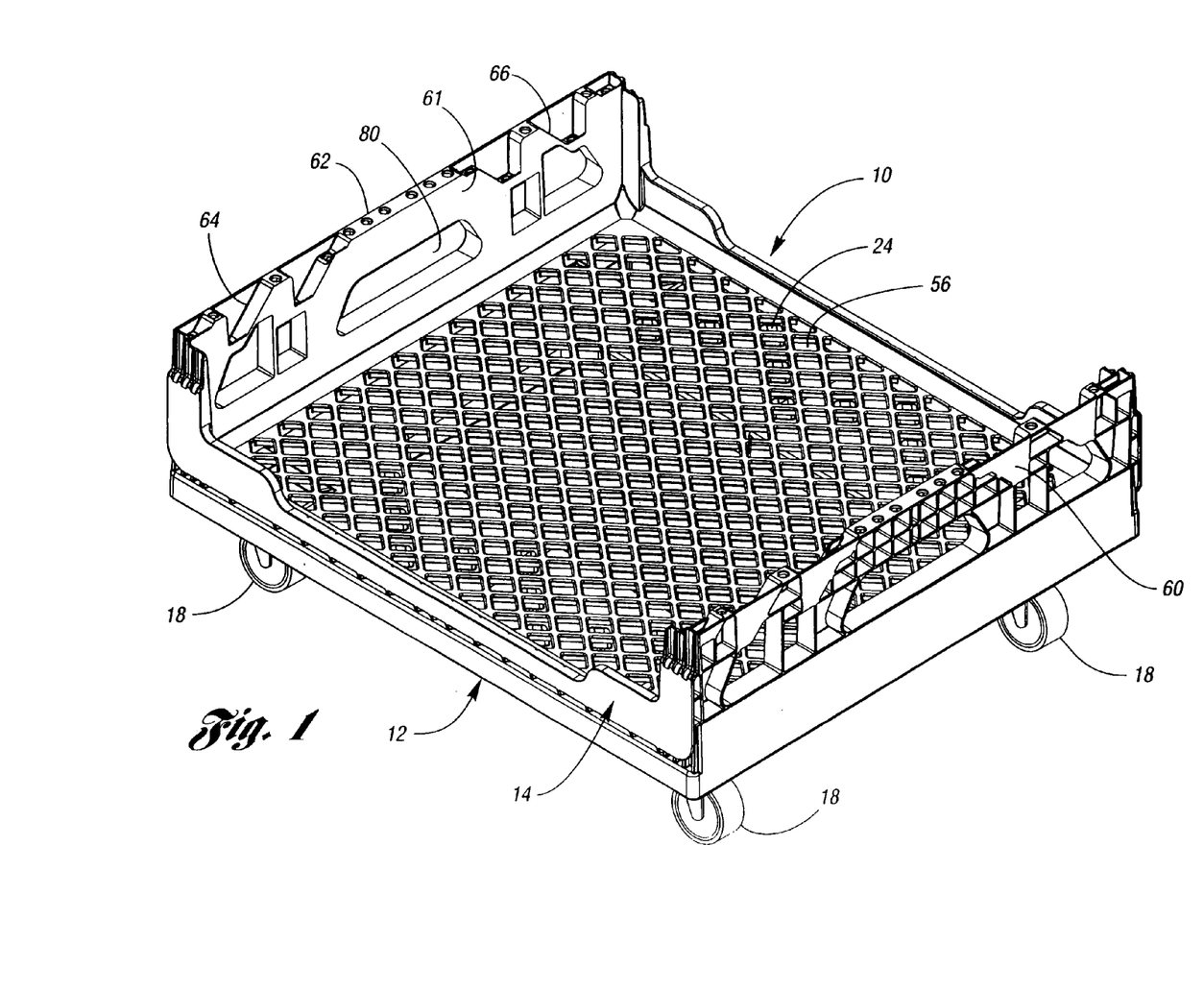
FIG. 1 illustrates a tray and dolly assembly of the present invention with the tray floor openings receiving the dolly floor protruding members and with the dolly and tray side walls interlocked, in top perspective view.
Figure 2:
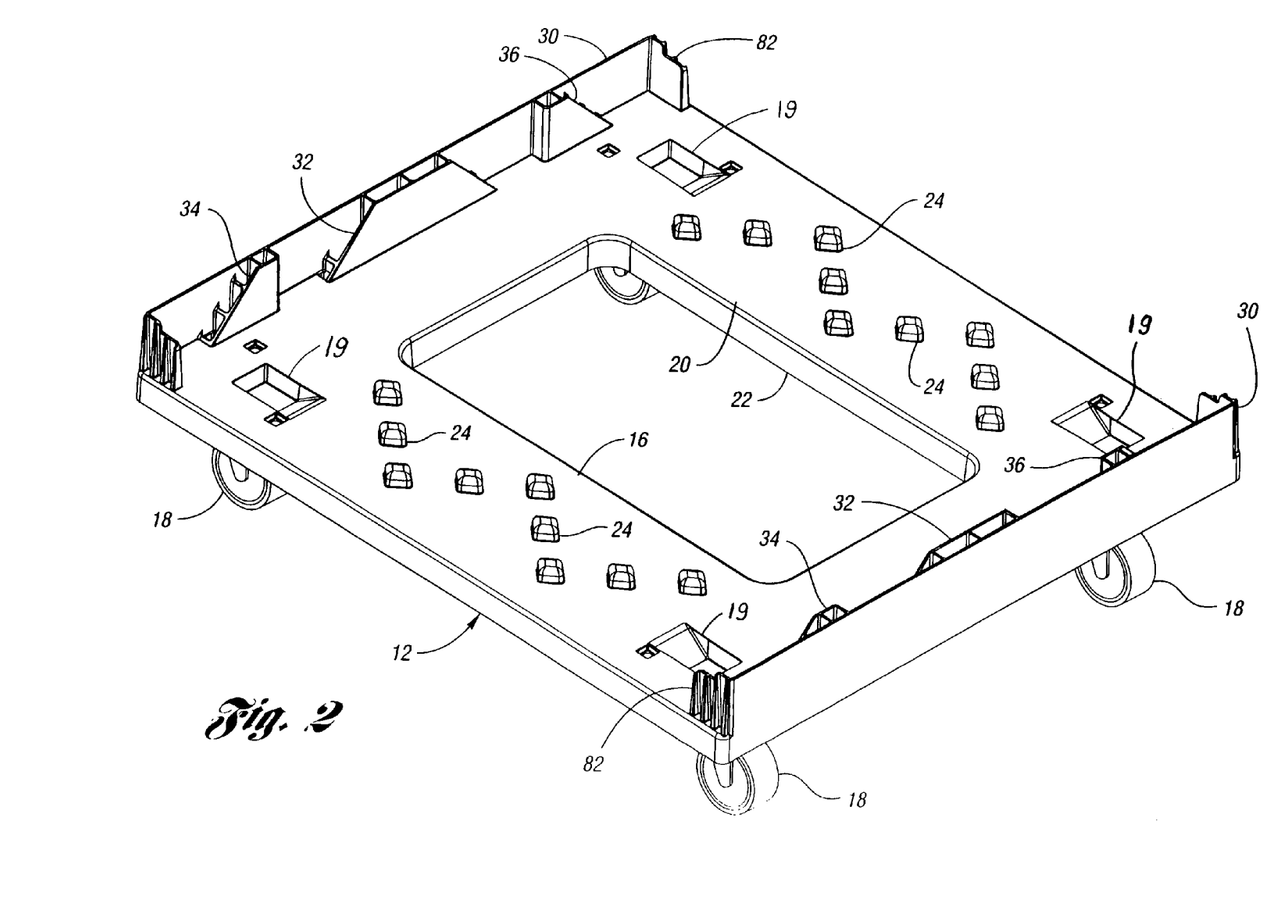
FIG. 2 is a top perspective view of the dolly of the assembly of FIG. 1.
Figure 3:
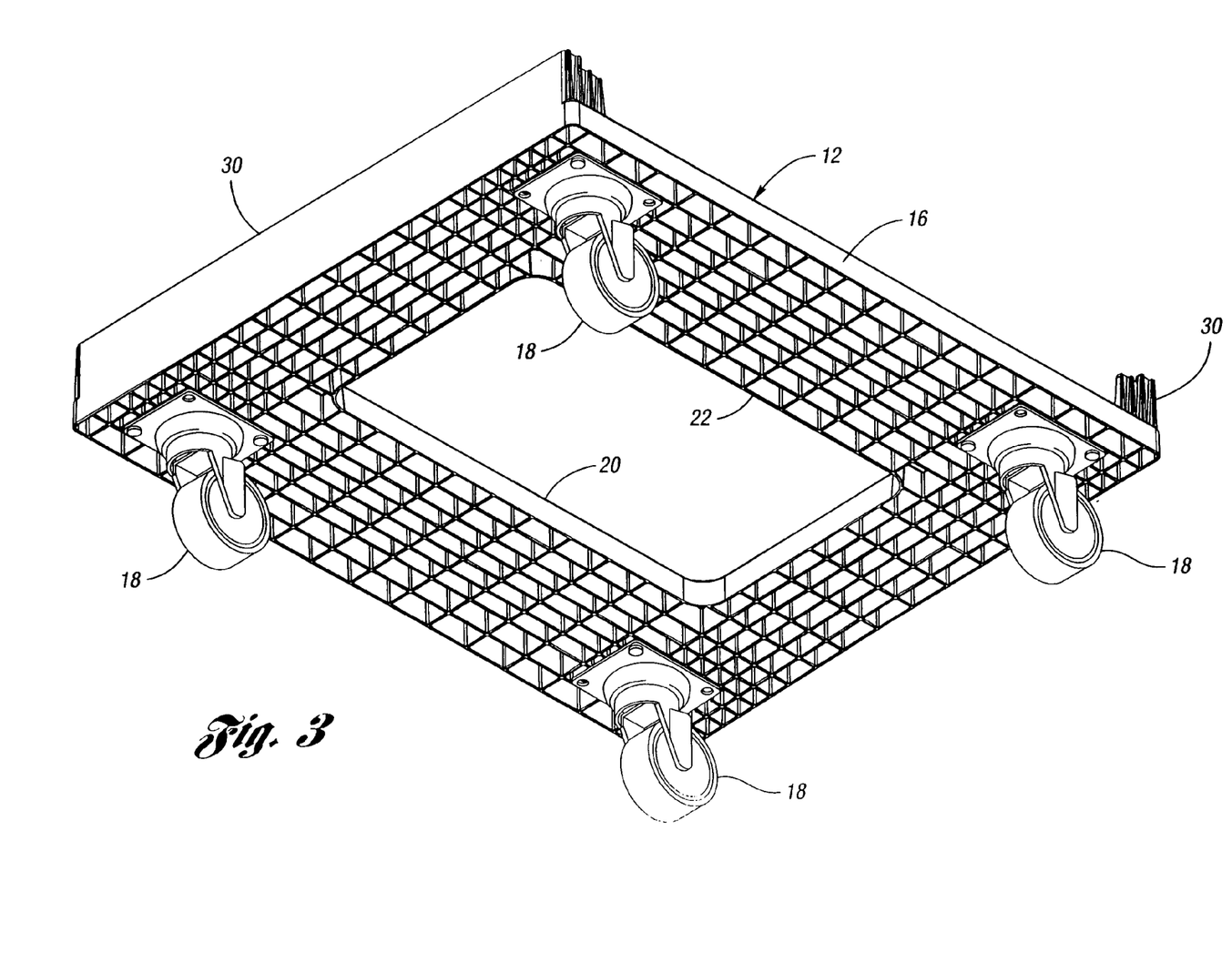
FIG. 3 is a bottom perspective view of the dolly of the assembly of FIG. 1.
Figure 4:
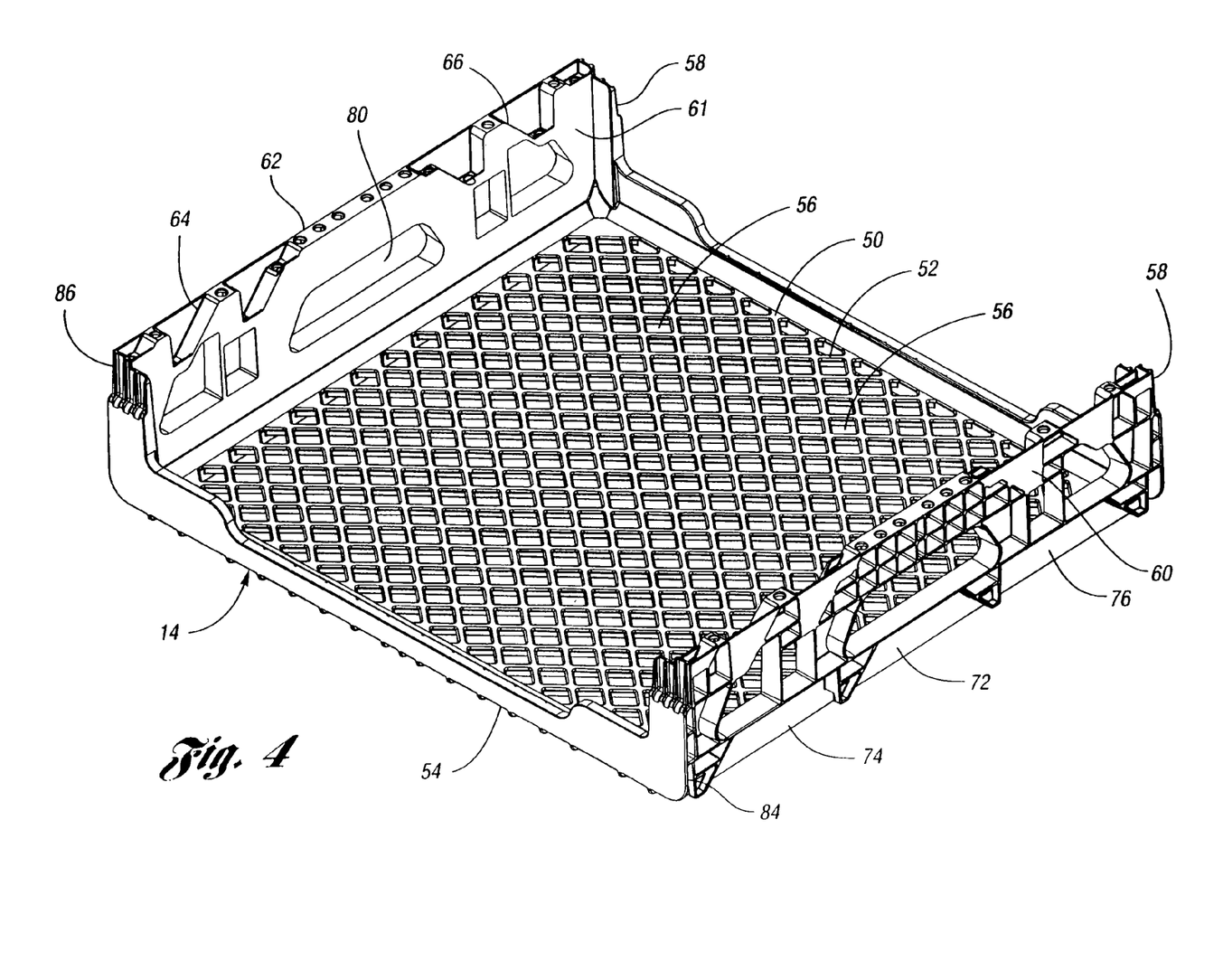
FIG. 4 is a top perspective view of the tray of the assembly of FIG. 1.
Figure 5:
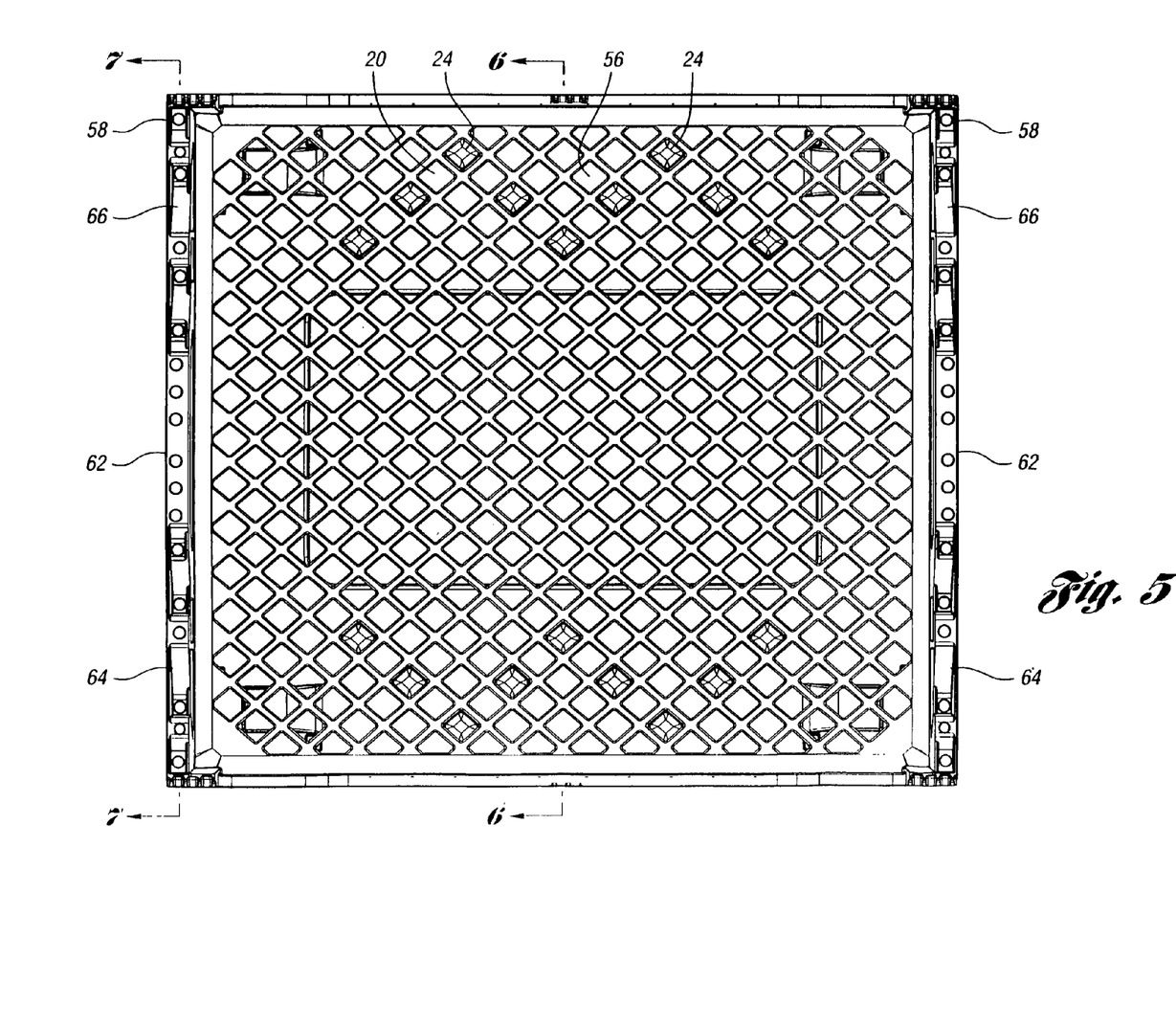
FIG. 5 is a top plan view of the tray and dolly assembly.

With reference to FIG. 1, a tray and dolly assembly according to the present invention is generally indicated at 10. The dolly is generally indicated at 12, while the tray is generally indicated at 14. With reference to FIGS. 1–5, and as best shown in FIGS. 2 and 3, dolly 12 has a floor 16. Floor 16 has an upper surface 20 and a lower surface 22. A plurality of bumps or protruding members 24 extend upwardly from upper surface 20. Dolly 12 further has a pair of opposed side walls 30. Each side wall 30 has a locking portion. The preferred locking portion for side wall 30 is composed of inwardly extending locking portions 32, 34, 36. Dolly 12 is preferably rectangular in shape and has four corners. A plurality of casters, such as four casters 18, supports the dolly floor with a caster 18 located proximate each corner of dolly floor 16. As best shown in FIG. 4, tray 14 has a floor 50. Tray floor 50 has an upper surface 52 and a lower surface 54. Tray floor 50 has a plurality of openings 56 generally corresponding in shape and size to protruding members 24. Tray 14 further has a pair of opposed side walls 58. Each side wall 58 includes a bottom locking portion and a top locking portion. In a preferred embodiment, the top locking portion of tray side wall 58 has an outer surface 60 and an inner surface 61, and includes a plurality of inwardly extending locking portions 62, 64, 66 that are shaped substantially the same as dolly side wall locking portion inwardly extending locking portions 32, 34, 36. That is, the tray side wall inwardly extending locking portions have a shape configured to receive a next tray, and similarly, the dolly side wall locking portion inwardly extending portions have a shape configured to receive a tray on the dolly. Shaped substantially the same means that both the dolly side wall and the tray side wall top locking portion have at least one inwardly extending portion that is the same shape (for example, triangular or trapezoidal).

As best shown in FIG. 2, dolly floor 16 includes four caster receiving recesses 19. Each recess 19 receives a caster 18 when dollies are stacked on top of each other for storage or any other purpose.

Figure 6:
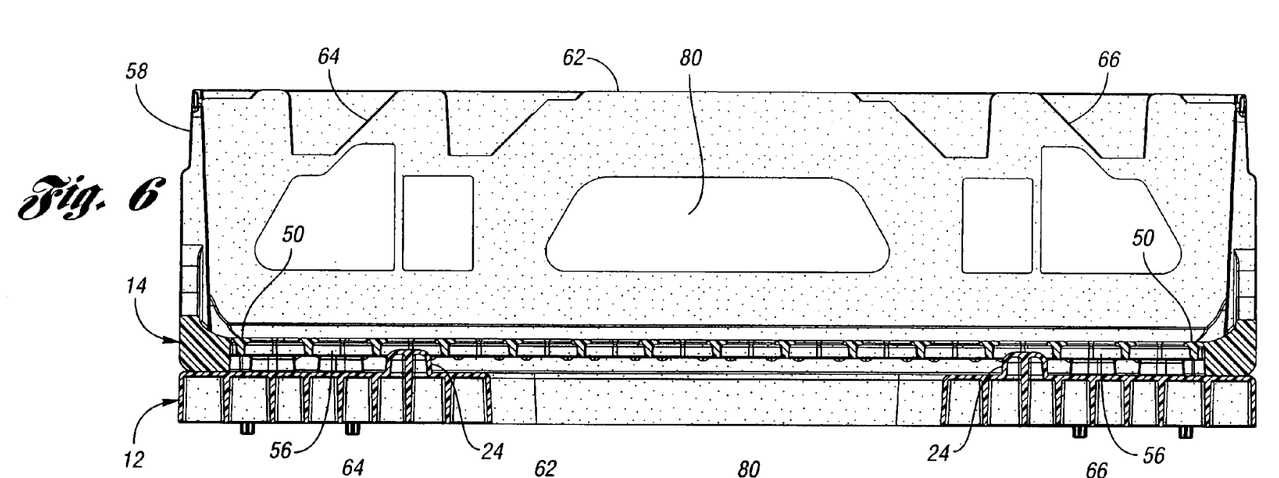
FIG. 6 is a cross-sectional view taken along line 6–6 of FIG. 5, and illustrates the plurality of protruding members extending into the plurality of openings.

With reference now to FIGS. 1–7, when tray floor 50 is received on dolly floor 16, the plurality of protruding members 24 extends into and are received by the plurality of openings 56 to interlock tray 14 with dolly 12. The interlocking feature of the tray and the dolly is best illustrated in FIG. 6. As shown in the cut away perspective view, protruding members 24 extend into openings 56. Preferably, the plurality of openings 56 in tray floor 50 extend through tray floor 50 as shown in the drawings. Of course, it is appreciated that, in the alternative as shown in FIG. 8, the openings 56' may only extend partially through the tray floor 50' to form a sufficiently recessed area to receive the protruding members 24 therein and interlock the tray 14' and dolly 12. But, preferably, the holes extend all the way through the tray floor to form a lattice as shown in FIG. 6. Nevertheless, in the preferred embodiment, the openings in the tray floor extend all the way through the tray floor. In addition, preferably, the plurality of protruding members 24 extends into the plurality of openings 56 but does not extend beyond tray floor upper surface 20. In this way, the protruding members function to interlock the tray and the dolly, yet do not interfere with the placement of items on the tray floor. As shown, tray floor 50 is a lattice structure defining the plurality of openings. Of course, other structures may be suitable for other tray floor implementations. Further, as shown, the protruding members and corresponding holes are diamond-shaped. However, other shapes for the protruding members are also suitable. In addition, it is appreciated that the dolly floor 16 is shown as rectangular in shape, and defining a central opening. However, although the rectangular dolly floor with a central opening is preferred, other dolly floor arrangements are possible.

FIGS. 1–7 also illustrate a second feature according to the present invention which is the abutting and mating of each dolly side wall locking portion with a corresponding tray side wall locking portion on the tray in order to interlock the dolly with the tray. As best shown in FIG. 2, dolly 12 has inwardly extending locking portions 32, 34, 36. Although there are many possible implementations for the inwardly extending locking portions, a preferred embodiment of dolly 12 utilizes a middle trapezoidal inwardly extending locking portion 32 and a pair of outside triangular inwardly extending locking portions 34 and 36. In turn, and as best shown in FIG. 4, tray 14 preferably includes a middle trapezoidal recess 72 at side wall 58, as well as a pair of outside recesses 74 and 76. According to this feature of the present invention, the dolly side wall locking portions 32, 34, 36 abut and mate with corresponding tray side wall bottom locking portions 72, 74, 76 on tray 14 to interlock dolly 12 with tray 14.

It is appreciated that embodiments of the present invention may incorporate either the dolly floor protruding members and tray floor openings feature to interlock the tray with the dolly, or may utilize the locking side wall feature to interlock the dolly with the tray. Accordingly, either feature may be used alone or both features may be used simultaneously. That is, in a preferred implementation, each dolly side wall locking portion is configured to abut and mate with a corresponding tray side wall bottom locking portion on the tray to interlock the dolly with the tray such that the plurality of protruding members extends into the plurality of openings.

Figure 7:
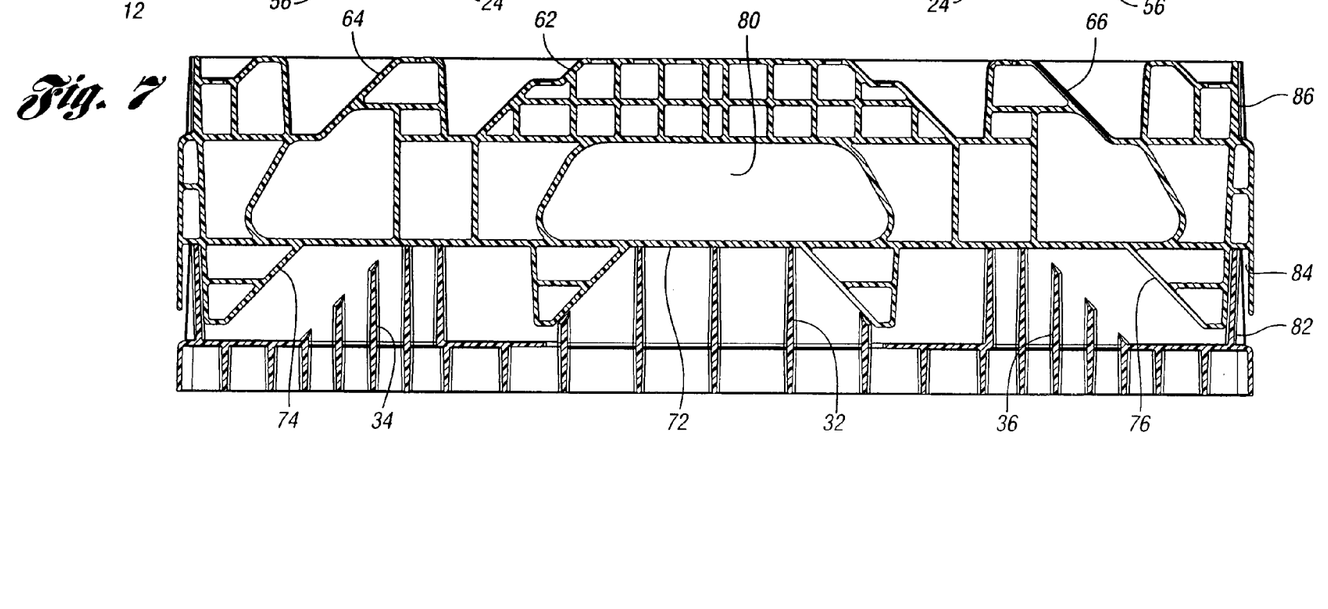
FIG. 7 is a cross-sectional view taken along line 7–7 of FIG. 5, and illustrates the interlocking of the dolly and tray side walls.
Figure 8:
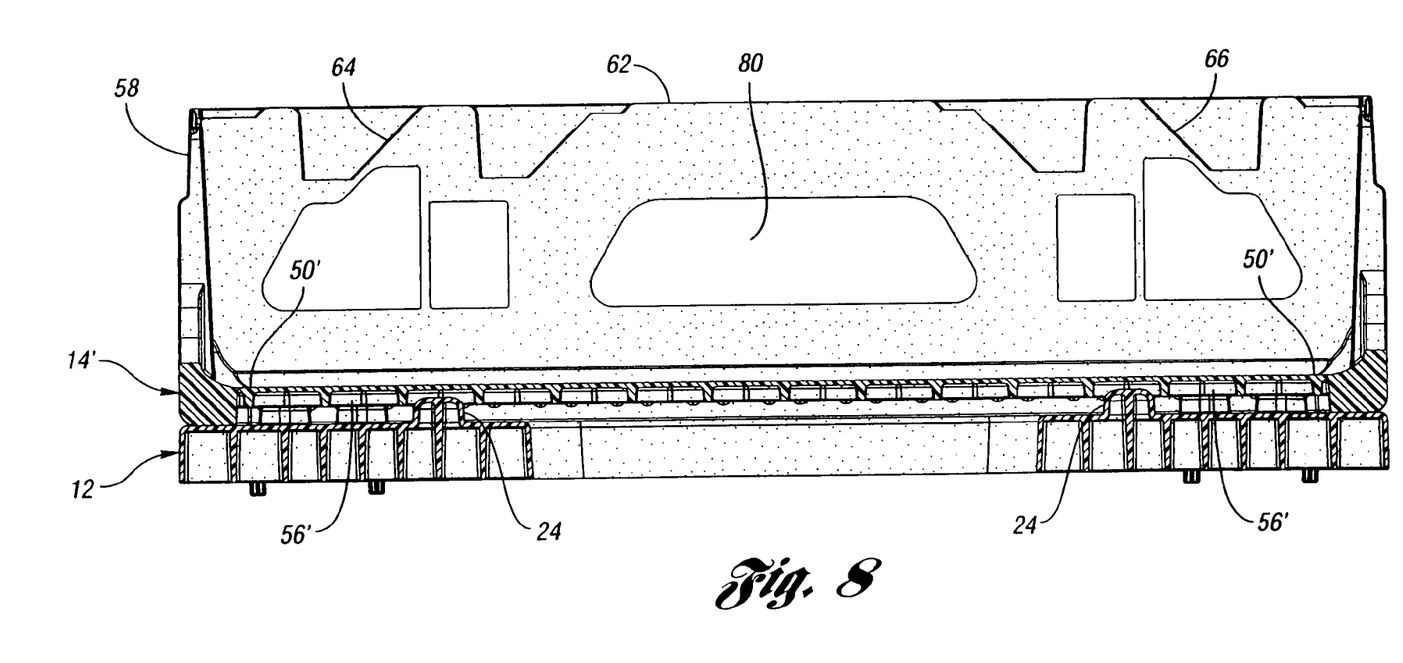
FIG. 8 is a cross-sectional view similar to FIG. 6, and illustrates the plurality of protruding members extending into the plurality of openings in an alternative embodiment.

FIG. 6 best illustrates the protruding members and openings feature, while FIG. 7 best illustrates the locking side walls. As best shown in FIG. 7, which is a cross-sectional view taken along line 7–7 of FIG. 5, the dolly and tray side walls engage each other. In FIG. 7, dolly inwardly extending locking portions 32, 34, 36 are illustrated extending inwardly from side wall 30 and in engagement and abutting bottom locking portions 72, 74, 76 of the tray side wall. Because of the position of the cutting plane line, FIG. 7 shows the ribs of the inwardly extending locking portions 32, 34, 36. In addition, the tray side wall top locking portions 62, 64, 66 are also shown. In preferred implementations, each tray side wall top locking portion is configured to abut and mate with a corresponding tray side wall bottom locking portion of a next tray to allow a stack of trays to be placed on the dolly with adjacent trays interlocked with each other. By way of example, in accordance with an embodiment of the present invention, the tray or trays may be made in accordance with the teachings of U.S. Pat. No. 5,881,902, but of course are not limited to that design. FIG. 7 also shows the handle 80 of tray 14.

Further, locking portions 32, 34, 36 of dolly 12 are preferably spaced and sized such that tray 14 will sit flush against dolly floor 16 with tray 14 in either orientation. That is, even though some trays are configured such that the distance between one tray floor and the next tray floor depends upon the relative orientation of the trays, tray 14 will sit flush against the dolly floor in either tray orientation because of the sizing and spacing of locking portions 32, 34, 36 as best shown in FIG. 2.

In addition to the already described features, a suitable tray and dolly assembly further interlocks via ribbed fingers 82 (FIG. 2) at each end of each dolly side wall 30. In addition to fingers 82 on the dolly, the tray includes four mating slots 84 (FIG. 4) for receiving the four fingers. Preferred trays include fingers 86 for interlocking with a next tray. Fingers 82, slots 84, and fingers 86 are also shown in FIG. 7.

It is appreciated that trays and dollies of the present invention include one or more features that provide complimentary geometry. That is, the tray geometry complimentary ments the dolly geometry. The complimentary geometry is advantageous in that the geometry interlocks a tray and a dolly. In addition, such complimentary geometry is useful because, in some implementations, the configuration for the dolly determines what type or types of trays may be properly received on the dollies.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tray and dolly assembly comprising:
   a dolly having a floor with upper and lower surfaces and a plurality of wheels extending downwardly from the lower surface; and
   a tray having a floor with upper and lower surfaces and with a plurality of openings, the tray having a pair of opposed side walls wherein each side wall has a bottom locking portion and a top locking portion, each top locking portion including a plurality of inwardly, upwardly opening recesses and inwardly, upwardly directed protrusions, each bottom locking portion including a plurality of outwardly, downwardly opening recesses and outwardly downwardly directed protrusions, such that the recesses and protrusions of the top locking portion of the tray would interlock with the protrusions and recesses of a bottom locking portion of a similar tray stacked thereon, the tray further including a lip protruding upwardly from a front edge of the floor, the lip substantially shorter than the side walls to define a front opening to the tray, the floor of the tray supportable on the floor of the dolly.

2. The tray and dolly assembly of claim 1 wherein the floor of the tray interlocks with the floor of the dolly to prevent the tray from sliding off the dolly.

3. The tray and dolly assembly of claim 1 wherein the dolly floor is generally rectangular in shape and defines a large central opening.

4. The tray and dolly assembly of claim 1 wherein at least one of the protrusions of the top locking portion includes a generally vertical edge and an inclined edge for abutting an inclined edge of a corresponding one of the protrusions of the bottom locking portion of the similar tray stacked thereon.

5. The tray and dolly assembly of claim 1 wherein the floor of the dolly includes a plurality of recesses for receiving wheels of a similar dolly stacked thereon.

6. The tray and dolly assembly of claim 1 wherein each side wall includes a handle extending therethrough between the top locking portion and the bottom locking portion of the corresponding side wall portion.

7. A tray and dolly assembly comprising:
   a dolly having a floor with upper and lower surfaces and a plurality of casters extending downwardly from the floor; and
   a tray having a floor with upper and lower surfaces and with a plurality of openings therethrough, the tray having a pair of opposed side walls wherein each side wall has a bottom looking portion and a top locking portion, each top locking portion including a trapezoidal locking portion projection upwardly, each bottom locking portion including a trapezoidal recess, trapezoidal locking portion of the top locking portion of the tray would be received in the trapezoidal recess of a bottom locking portion of a similar tray stacked thereon, the tray further including a lip protruding upwardly from a front edge of the floor, the lip substantially shorter than the side walls to define a front opening to the tray, the floor of the tray supportable on the floor of the dolly.

8. The tray and dolly assembly of claim 7 wherein the floor of the tray interlocks with the floor of the dolly to prevent the tray from sliding oil the dolly.

9. The tray and dolly assembly of claim 8 wherein the dolly floor is generally rectangular in shape and defines a large central opening.

10. The tray and dolly assembly of claim 9 wherein the floor of the dolly includes a plurality of recesses for receiving wheels of a similar dolly stacked thereon.

11. The tray and dolly assembly of claim 7 wherein each side wall includes a handle extending therethrough between the top locking portion and the bottom loelcing portion of the corresponding side wall portion.

* * * * *